Oct. 20, 1942.    R. A. MANN ET AL    2,299,161
VEHICLE SEMAPHORE SIGNAL MEANS
Filed July 3, 1940    6 Sheets-Sheet 1

Inventors
RUFUS A. MANN
WILLIAM H. MILLS
By Clarence A. O'Brien
Attorney

Inventors
RUFUS A. MANN
WILLIAM H. MILLS
By Clarence A. O'Brien
Attorney

Oct. 20, 1942.   R. A. MANN ET AL   2,299,161
VEHICLE SEMAPHORE SIGNAL MEANS
Filed July 3, 1940   6 Sheets-Sheet 6

Inventors
RUFUS A. MANN
WILLIAM H. MILLS
By Clarence A. O'Brien
Attorney

Patented Oct. 20, 1942

2,299,161

UNITED STATES PATENT OFFICE 2,299,161

VEHICLE SEMAPHORE SIGNAL MEANS

Rufus A. Mann and William H. Mills, Kingsport, Tenn.

Application July 3, 1940, Serial No. 343,848

4 Claims. (Cl. 177—327)

Our invention relates to improvements in electrically operated semaphore signal devices for automobiles, and the primary object of our invention is to provide improved electromechanical actuating means and signal initiating means in manually controlled relation thereto whereby more efficient operation is obtained as well as superior durability, the subject matter of the present application being a continuation in part of our copending application Serial No. 295,964, filed September 21, 1939, and entitled "Motor vehicle signal means."

Another important object of our invention is to provide more efficient and more rugged electric motor means for mechanically operating the semaphore, the said motor means having incorporated therein in unitary manner switch means operated from the motor means for the purpose of conditioning subsequent operation of the motor means.

Another important object of our invention is to provide simple means operated by said switch means for reversing the fields of the electric motors involved at predetermined stages of their operation to produce either resetting of said motor means to starting position or to produce cyclic operation of said motor means.

Other important objects of our invention will be apparent from a reading of the following description and the appended drawings wherein preferred embodiments of our invention are set forth for illustrative purposes.

In the drawings:

Figure 12 is a general schematic diagram showing the electrical connections between the source of energy, the motor, the manually operated semaphore operation conditioning switches, the motor operated switches and the motor field reversing relays.

Figure 1:
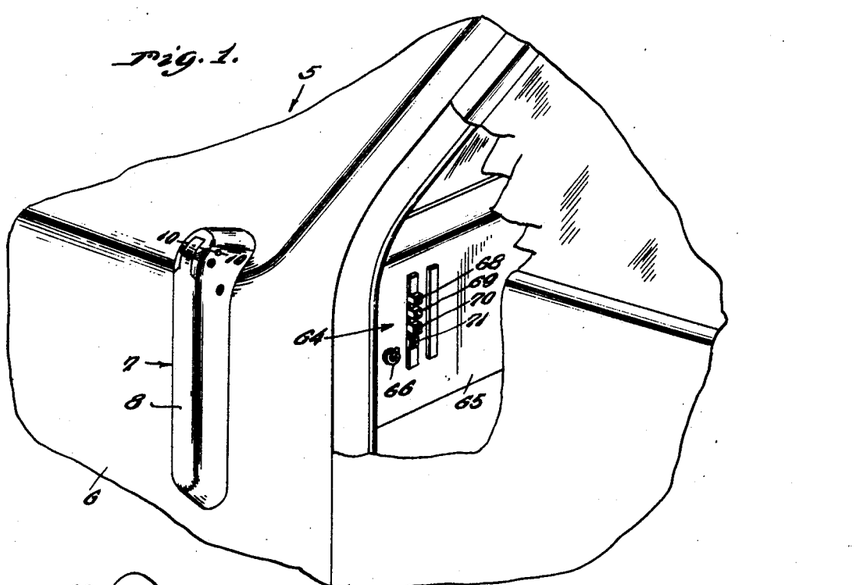
Figure 1 is a fragmentary perspective view showing the left or driver's side of an automobile on which the semaphore signal is mounted and broken away to show the series of operating switch buttons and the main cut-off toggle switch.
Figures 2, 3, 4:
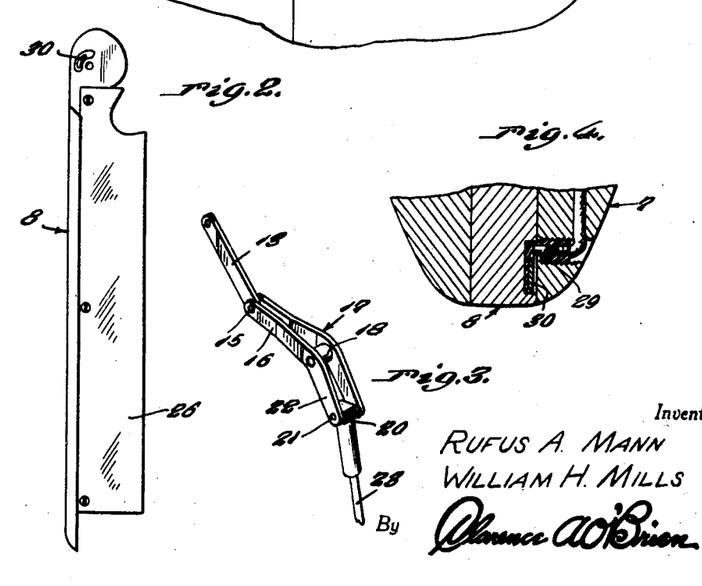
Figure 2 is a rear elevational view of the semaphore arm removed from its casing.
Figure 3 is an enlarged perspective view of the cable actuated yoke connected to operate said semaphore arm.
Figure 4 is a fragmentary enlarged transverse vertical sectional view taken through the lower part of the signal casing and showing the cut-off switch operated by the semaphore arm.
Figure 10:
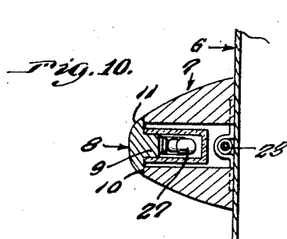
Figure 10 is a horizontal sectional view taken through Figure 9 approximately on the line 10—10 and looking downwardly in the direction of the arrows.
Figure 11:
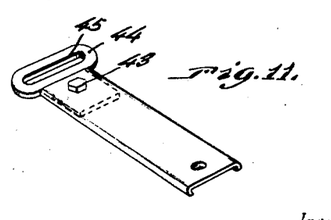
Figure 11 is a perspective view of the cable operating slide.

Referring in detail to the drawings, the numeral 5 generally designates a typical automobile having the cowl 6 on the left hand side of which is secured the vertical elongated streamlined semaphore casing 7 whose inboard side is contoured to the shape of the cowl. The semaphore casing 7 is hollow to accept the semaphore arm 8 flush with the outboard side of the casing when in inoperative position, and to accommodate the linkage and cable for operating the semaphore arm. The semaphore arm is substantially T-shaped in cross section so that when the portion 9 enters the opening 10 in the casing the flanges 11 abut the edges of the opening as shown in Figure 10. The outboard side of the semaphore 8 is contoured to merge with the sides and the top and bottom of the semaphore casing.

Figure 5:
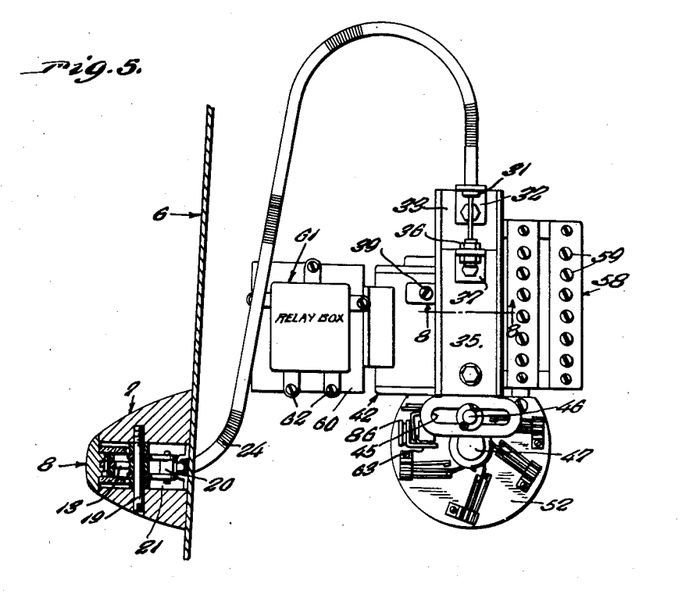
Figure 5 is a general horizontal sectional view taken through Figure 9 and looking downwardly in the direction of the arrows.

The upper end of the semaphore arm swings on a horizontal pivot 12 mounted in the upper part of the casing and below this point the upper end of a straight link 13 is pivoted at 14 to the semaphore arm. The depressed end of this link is pivoted at 15 between the depending arms 16 of a duplex bell crank 17 which has a journal bearing 18 turning on an axle 19 mounted in and between the sides of the casing as shown in Figure 5. A cable end anchor 20 is pivoted at 21 to and between the free ends of the bell crank arms 22. The cable 23 attached to the anchor 20 passes downwardly through the cable conduit 24 through an opening 25 in the side of the cowl into the interior of the automobile, wherein the operating mechanism is conveniently mounted. The semaphore arrangements described above apply to both of the embodiments described and set forth in this application.

Figure 9:
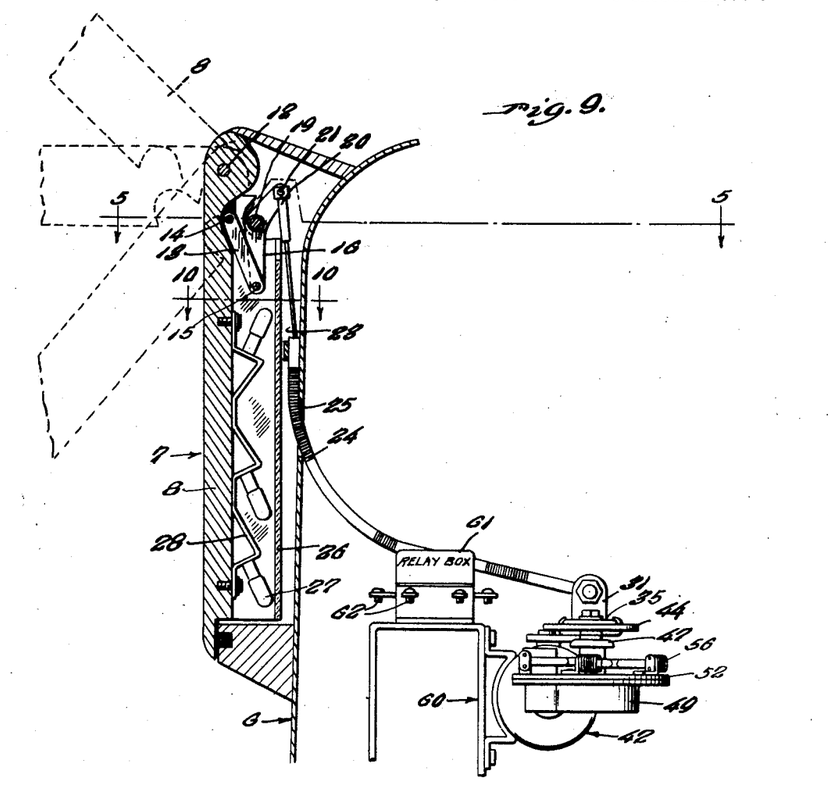
Figure 9 is an enlarged transverse vertical sectional view taken through the semaphore arm and casing and adjacent portion of the automobile and showing the operating mechanism related thereto in side elevation.

Besides the T-shaped cross section portion, the semaphore arm comprises the translucent material housing 26 which encloses the illuminating bulbs 27 mounted angularly on brackets 28 secured to the arm as shown in Figure 9, with the necessary energizing wires (not shown) led into the interior of the automobile. A pressure opened switch arrangement 29 connected in these wires cuts off the bulbs 27 while the semaphore arm is closed and energizes the bulbs in all open positions of the semaphore arm so as to illuminate the arm in all operative positions thereof. A spring pressed contact 29 on the casing 7 works against an arcuate contact 30 on the semaphore arm for turning on and off the bulbs on the semaphore arm as it leaves inoperative position and as it returns to inoperative position, respectively.

The depressed end of the cable conduit 24 is anchored at 31 to an L-shaped bracket 32 rising from a stationary slide guide 33 which has channel-shaped sides 34 slidably confining the channel-shaped slide 35 to which the cable 23 is fastened at 36 to an L-shaped bracket 37 rising from the slide. The slide guide 33 is mounted on a V-shaped bracket 38 whose legs are connected at 39 and 40 to the housing 41 of the six-volt electric motor 42. The slide 35 has fastened to the underside thereof at 43 an extension on a slideway 44 which has an elongated slot 45 extending at right angles to the path of movement of the slide 35. In this slot 45 works the eccentric pin 46 on the enlargement 47 on the upper end of the vertical shaft 48 which is mounted in the housing 49 and has fixed thereto the wormwheel 50 which is in mesh with the worm 51 on the horizontal shaft of the motor 42. The said housing is suitably supported with respect to said motor and on top of said casing is an upper plate 52, through which the enlargement 47 on the shaft 48 extends. An insulated cam 53 is fixed to this part of the shaft for operative engagement with the switches 54, 55, 56 and 57, respectively, which are insulated from the plate 52. Supported at one side of the slide mechanism is the binding post assemblies 58, including the necessary binding posts 59 to which are connected the various wires from the switches 54, 55, 56 and 57 and other portions of the electrical circuits involved. On the opposite side of the motor 42, bracket means 60 mounts the motor field reversing relay box 61 with connection tabs 62, the said box containing the two relays involved. It is believed obvious from the foregoing description of the slide and eccentric pin arrangement that, as the motor 42 is operated under the control of the manual control switch arrangement 64 on the instrument panel 65, the cut-off switch 66 having been closed, the slide 35 will be moved along the slide guide 33 to different positions in a manner to be described, whereby the semaphore arm 8 is moved through different signalling positions.

The manual control switch arrangement 64 is similar to the conventional station selecting push-button controls used on radio receivers, wherein the pressing in of any one of the buttons 67 procures retention of this button and the circuit closed thereby at the same time that all others of the buttons are allowed to remain out or are restored to open positions. In this way the circuit conditions producing any particular operation of the semaphore arm 8 are automatically maintained until another button is pressed in. The buttons consist of the right turn button 68, the left turn button 69, the stop button 70 and the restoring or off button 71.

Figure 6:
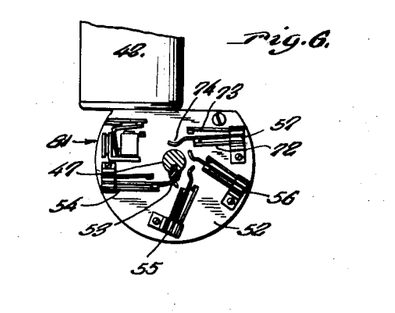
Figure 6 is a fragmentary vertical longitudinal sectional view taken through Figure 5 to show the cam in normal starting position in relation to the circumferentially distributed switches.
Figure 7:
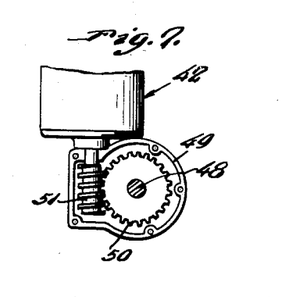
Figure 7 is a fragmentary plan view of the motor with cam operating gearing exposed.
Figure 8:
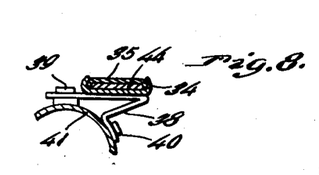
Figure 8 is a fragmentary horizontal sectional view taken through Figure 5 approximately on the line 8—8 and looking upwardly in the direction of the arrows.

The switches 54, 55, 56 and 57 each comprise two outer spring arms 72 and 73 respectively and a single inner arm 74, the inner arm 74 normally being engaged with the outer arm 72, except in the starting position shown in Figures 6 and 12 wherein the cam 53, which engages only the longer inner arm 74, deflects this arm into engagement with the arm 73 and out of engagement with the arm 72.

Referring now to Figure 12 of the drawings, the automobile battery 75 has one side grounded to the chassis at 75' and leading from its other side is the wire 76' in which the ignition switch 76 is connected. The wire 76' connects with the ungrounded sides of the semaphore arm bulbs 27 with the remaining sides of the bulbs ground at 27', the instrument panel switch 66 being connected in the wire 76'. A branch wire 82 connects the wire 76' with one side of all of the instrument panel manual control switches 68, 69, 70 and 71, and a lead 83 from the wire 82 above these switches connects with a stationary contact 84 of the motor field reversing relay 78, which with its companion relay 77 is housed in the relay box 61.

A second stationary contact 85 of the relay 78 is grounded at 86 and between these operates the conductive armature 87 which is normally engaged with the contact 85 by the spring 88. The armature is connected to one side of the field coils 79 of the motor 42, the remaining side of the field coils being connected to the conductive armature 87' of the similar and companion field reversing relay 77 which has stationary contacts 84' and 85' like the contacts 84 and 85, with armature 87' normally engaged with the contact 85' by the spring 88'. The contact 85' is grounded at 86'. The magnet coils 89 and 89', respectively, of the two relays have one side grounded at 90 and 90', respectively, and their remaining sides connected with respective wires 91 and 91'. The wire 91 leads to the middle spring arm 74 of the return switch 54. The wire 91' leads to the middle spring arm of the stop switch 55 and branches 92 and 93 connect with the middle arms of the left and right turn switches 56 and 57, respectively.

The wire 91 has a branch 94 leading a stationary contact 95 of the relay switch 81. Another branch 96 connects with one side of the magnet winding 97 whose remaining end is grounded at 98. The relay switch 81 includes the upper spring arm 99 with which the conductive armature 100 is normally engaged by the spring 101. The spring arm 99 is connected by the wire 102 with the wire 91' and the armature 100 is connected by the wire 103 with one side of the armature winding 80 of the motor 42 with the remaining side of the armature winding grounded at 104.

The cooperative relation of the cam operated switches 54, 55, 56 and 57 with the manual push button switches 71, 70, 69 and 68 will appear from the facts that the arm 72 of the return switch 54 is connected by the wire 105 with the right hand side of the normally closed manual return switch 71, with the arm 73 connected with the left hand side of the switch 71 by the wire 105'. The outer arms of the switches 55, 56 and 57 are connected in similar manner to the opposite sides of the manual switches 70, 69 and 68 in similar manner.

*Operation*

To operate the semaphore to signal a right turn the driver pushes in the right-turn button 68. This starts the motor 42 which moves the slide 35 to which the cable 28 is attached. As the slide moves, the cable pulls the bell crank or lever arm, which, being attached to the semaphore arm, raises the semaphore arm to an angle of 145°, the correct position to indicate a right turn.

The semaphore signal is connected through the ignition switch to the battery of the car. Thus, the signal will operate only when the ignition switch is on. Supposing the ignition switch to be on, current flows from the battery 75 through wire 76' to the manually controlled switches 64, and also through the two branch wires leading from the wire 76' to the contact points 84' of the relay switch. Thus when the right turn button 68 is pushed in, a circuit to arm 72 of contact switch 57 is closed. Since arm 72 and arm 74 are engaged current flows through wire 91' to and through the field coil 89', the other side of which is grounded at 90'. As current flows through the field coil 89' a magnetic field is set up which draws armature arm 87' into contact with contact point 84'. This will allow a flow of current through field circuit 79 of motor 42 to armature arm 87 which is grounded by contact point 85 at 86. At the same time that above circuit is being closed the circuit to the motor is closed by wire 102 leading to spring arm 99, spring arm normally being in contact with armature 100 and wire 103 connecting armature arm 100 to motor 80, the other side of which is grounded at 104, thereby setting the motor into motion. The motor runs until cam 53 raises contact arm 74 of switch 57, which breaks the circuit to the motor and contacts arm 73 which is grounded by wire leading to manually controlled switch button 68. This deenergizes the motor causing it to stop instantly at desired signal position. Also, the illuminating bulbs in the signal arm are lighted by a spring contact switch. One side of the switch is connected to the bulbs and the other side is connected through a toggle switch 66, to the battery wire. As the signal arm rises, the spring contact switch closes and allows a flow of current through the light bulbs which have one side grounded, thus illuminating the bulbs.

To make a left turn the driver pushes in the left-turn button. This starts a motor which moves a slide to which a cable is attached. As the slide moves, the cable pulls a bell crank or lever arm, which, being attached to the signal arm, raises the signal arm to an angle of 90°, the desired position to indicate a left turn.

The semaphore signal is connected through the ignition switch of the car to the battery. Thus, the signal will operate only when the ignition is on. Supposing the ignition to be on there is a current flow from the battery 75 through wire 76' to the manually controlled switches 64. There are, also, two branch wires leading from wire 76' to the contact points 84' of the relay switch. To make a left turn signal, switch button 69 is pushed in. This closes a circuit to arm 72 of contact switch 56. Since arms 72 and 74 are closed this allows a current flow through wire 91' to and through the field coil 89', the other side of which is grounded at 90'. As current flows through the field coil 89' a magnetic field is set up which draws armature arm 87' into contact with contact point 84'. This will allow a flow of current through field circuit 79 of motor 42 to armature arm 87 which is grounded by contact point 85 at 86. At the same time that above circuit is being closed, the circuit to the motor is closed by wire 102 leading to spring arm 99, the spring being normally in contact with armature 100 and wire 103 connecting armature arm 100 to motor 80, the other side of which is grounded at 104, thereby setting the motor into motion. The motor runs until cam 53 raises contact arm 74 of switch 56, which breaks the circuit to the motor and contacts arm 73 which is grounded by wire leading to manually controlled switch button 69. This deenergizes the motor causing it to stop instantly at desired signal position. Also, the illuminating bulbs in the signal arm are lighted by a spring contact switch. One side of the switch is connected to the bulbs and the other side is connected through a toggle switch 66, to the battery wire. As the signal arm rises, the spring contact switch closes and allows a flow of current through the light bulbs which have one side grounded, thus illuminating the bulbs.

To make a stop signal the driver pushes in the stop button. This starts a motor which moves a slide to which a cable is attached. As the slide moves, the cable pulls a bell crank or lever arm, which, being attached to the signal arm, raises the signal arm to an angle of 45°, the desired position to indicate a stop.

The semaphore signal is connected through the ignition switch of the car, to the battery. Thus, the signal will operate only when the ignition is on. Supposing the ignition to be on there is a current flow from the battery 75 through wire 76' through wire 82 to the manually controlled switches 64. There are, also, two branch wires leading from wire 76' to the contact points 84' of the relay switches. To make a stop signal, switch button 70 is pushed in. This closes a circuit to arm 72 of contact switch 55. Since arms 72 and 74 are closed this allows a current flow through wire 91' to and through the field coil 89', the other side of which is grounded at 90'. As current flows through the field coil 89' a magnetic field is set up which draws armature arm 87' into contact with contact point 84'. This will allow a flow of current through field circuit 79 of motor 42 to armature arm 87 which is grounded by contact point 85 at 86. At the same time that above circuit is being closed, the circuit to the motor is closed by wire 102 leading to spring arm 99, the spring being normally in contact with armature 100 and wire 103 connecting armature arm 100 to motor 80, the other side of which is grounded at 104, thereby setting the motor into motion. The motor runs until cam 53 raises contact arm 74 of switch 55, which breaks the circuit to the motor and contacts arm 73 which is grounded by wire leading to manually controlled button 70. This deenergizes the motor causing it to stop instantly at desired signal position. Also, the illuminating bulbs in the signal arm are lighted by a spring contact switch. One side of the switch is connected to the bulbs and the other side is connected through a toggle switch 66 to the battery wire. As the signal arm rises the spring contact switch closes and allows a flow of current through the light bulbs which have one side grounded, thus illuminating the bulbs.

To reset or return the signal arm to its initial position or off position, the off button is pushed in by the driver. This sets the motor in reverse motion, thereby moving the slide, cable and hence signal arm, back to its original or off position.

Figure 18:
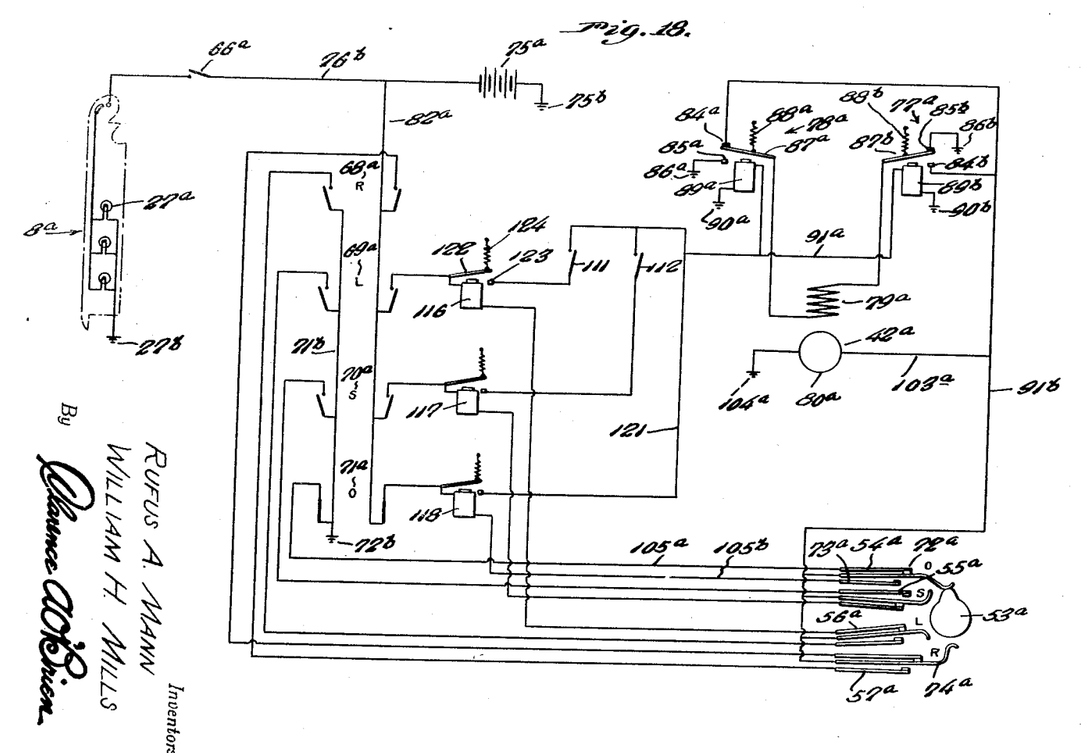
Figure 18 is a general schematic diagram showing the electrical connections of the second described embodiment.

Supposing the semaphore arm to be in a signal position, the return of the semaphore arm is produced as follows: The return button 71 is pushed in by car driver, thereby closing the contacts thereof as shown in Figures 12 and 18, thereby causing current to flow through wire 105 to contact point 72 of switch 54. The contact point 72 is engaged with contact arm 74 and in circuit with a wire 91 connected to a field coil 89, the other side of which is grounded at 90. This flow of current sets up a magnetic field drawing armature 87 into contact with point 84. This will allow a flow of current through field circuit 79 of motor 42 to armature arm 87 which is grounded by contact point 85 at 86. This flow of current is reverse to that of the signals and allows the motor to run in reverse direction to that of the signals.

At the same time that above circuit is being closed, current flows by a branch wire 96 to one side of field coil 97, the other side of which is grounded at 98. This sets up a magnetic field which draws armature arm 100 into contact with point 95 which is connected by a branch wire 94 to wire 91, thus allowing current to flow by wire 103 to motor 80, the other side of which is grounded at 104. This sets the motor in motion. However the motion of the motor will be reverse to that which operates the signals, since the field circuit has been reversed. The motor will run in this direction until cam 53 raises the contact arm 74, of switch 54, thereby breaking circuit to motor and also closing contact 74 with 73 which is grounded by wire leading to manually controlled switch button 71. This deenergizes the motor causing it to stop instantly and at its initial or off position.

Referring now to the embodiment of the invention shown in Figures 13, 14, 15 and 18, this differs from the first described embodiment chiefly in the arrangement of the motor operated switches in the lower part of the gear housing, with the shaft of the motor projecting laterally at right angles to the plane in which the slide works and at one side of the camshaft, and in the employment in addition to the motor field reversing relays 77 and 78 of three circuit breaking relays whose presence produces automatic restoration of the semaphore arm to starting position after performance of a signalling operation. In the first described embodiment the semaphore stays in the position into which it is operated until returned to initial position by pressing the button 67 of the return switch 71.

Figures 13, 14, 15, 16, 17:
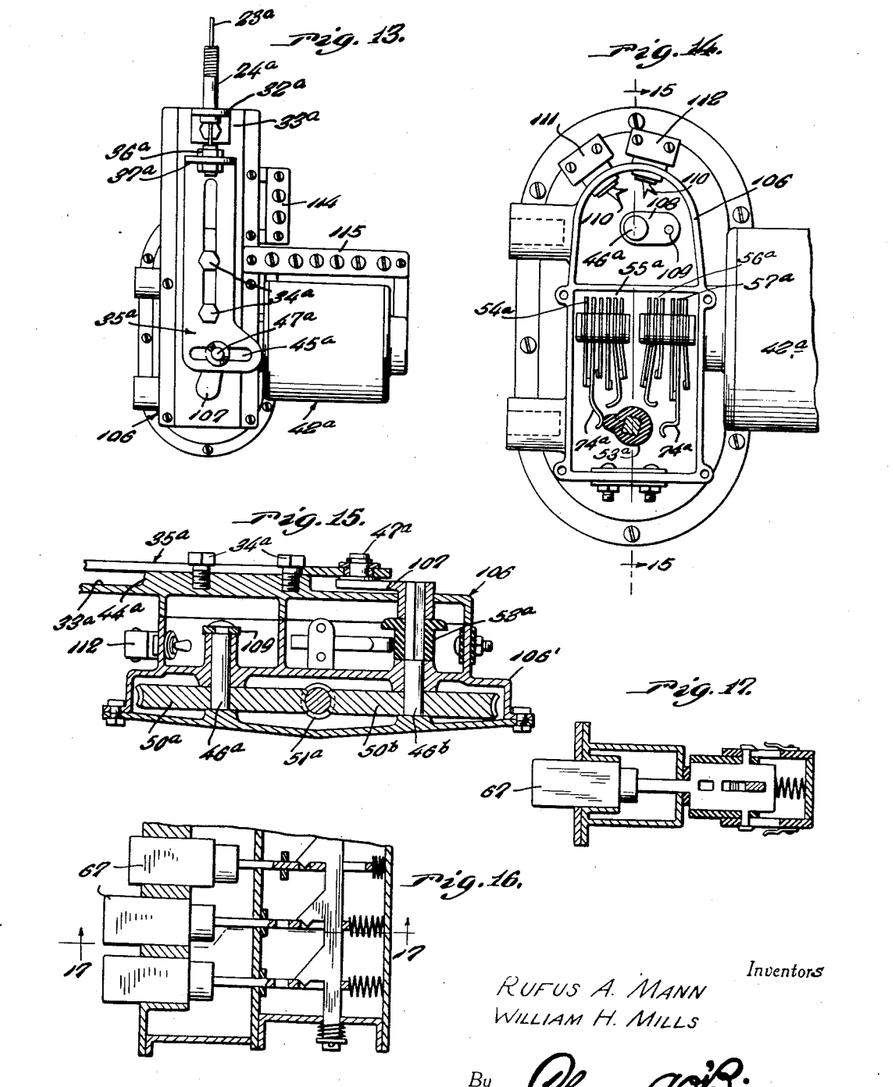
Figure 13 is a top plan view of another form of motor means wherein the arrangements of the cam operated switches and of the cable operating slide are different from the first described embodiment.
Figure 14 is a fragmentary enlarged top plan view of Figure 13 with the cover and the cable operating slide structure removed to expose the cam operated switches.
Figure 15 is a transverse vertical sectional view taken through Figure 14 approximately on the line 15—15 and looking toward the right in the direction of the arrows.
Figure 16 is a fragmentary enlarged vertical transverse sectional view taken through the manual signal control switch casing.
Figure 17 is a horizontal sectional view taken through Figure 16 approximately on the line 17—17 and looking upwardly in the direction of the arrows.
Figure 16:
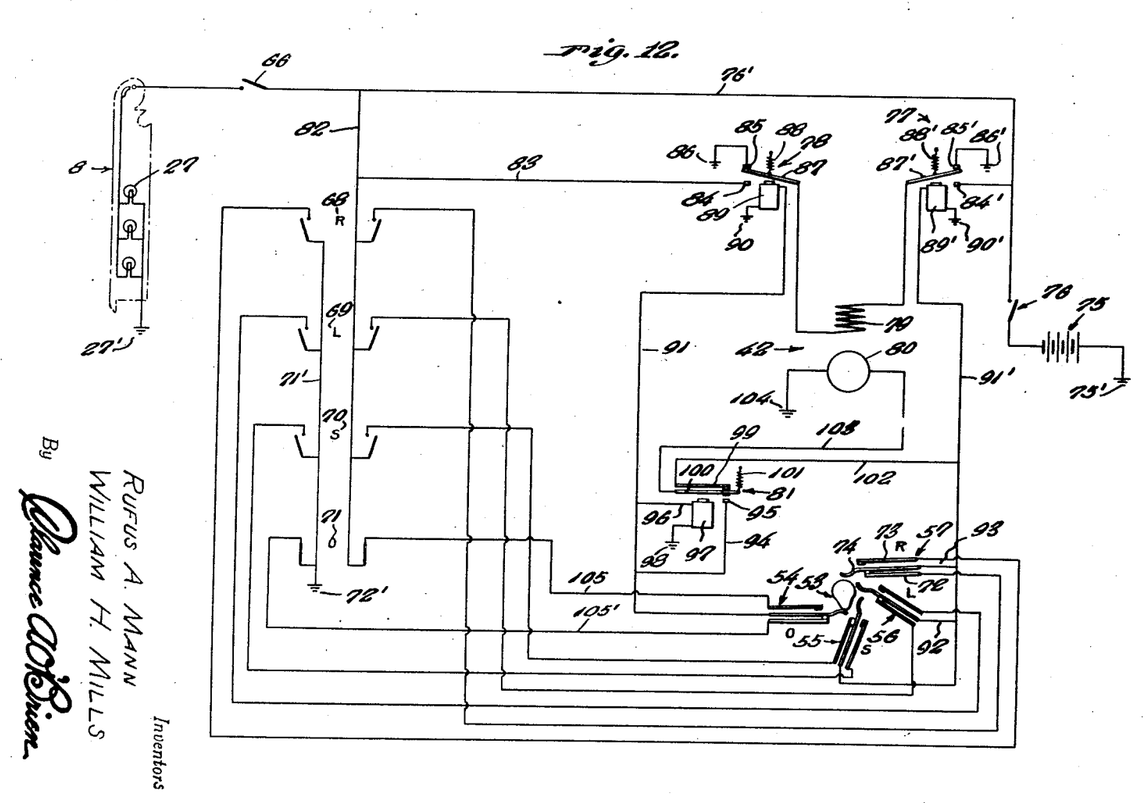

In the present embodiment the electric motor 42a is mounted to one side of the oblong housing 106 with its shaft extending therein at right angles and provided with a worm 51a in mesh with and between twin wormwheels 50a and 50b on shafts 46a and 46b, respectively, journalled, as shown in Figure 15, in an enlargement 106' on the bottom of the housing 106. The shaft 46b is the camshaft and extends up into the housing where it has fixed thereto an insulated cam 53a. A crank 107 works through the top of the housing above the cam and has an eccentric pin 47a working in the slot 45a on the end of the slide 35a which has its opposite end secured at 36a, 37a to the cable 20a with the cable conduit 24a fastened to a bracket 32a on the top 33a of the housing 106. Bolts 34a rising from the top of the housing pass through a longitudinal slot in the slide to allow the same to slide on a raised portion 44a of the housing top 33a. The shaft 46a also rises into the housing 106 where it is equipped with a lateral arm 108 having a depending pin 109 to catch in between the pairs of fingers 110 on the toggle switch 111 and 112 which are mounted through the sidewall of the housing 106.

The motor operated switches, in this instance, designated 54a, 55a, 56a and 57a, respectively, are mounted side by side and in alignment in the housing 106 adjacent to the cam 53a and have their middle spring arms 74a elongated and equipped with curved terminals to cooperate with the cam 53a as the cam turns in a clockwise direction as seen in Figure 14 with the arm 109 turning in the opposite direction. Insulated binding post strips 114 and 115 are mounted on the housing 106 and on the motor 42a, respectively, to facilitate the necessary electrical connections.

Referring to Figure 18 of the drawings wherein the components had in common with the first described embodiment are primed with the small letters $a$ and $b$, respectively, absence of the relay switch 81 is to be noted and the presence in the place thereof of the three magnetic switches 116, 117 and 118, respectively, and of the two toggle switches 111 and 112, respectively.

The middle arms of the motor operated return switches 54a, 55a, 56a and 57a are all connected to the wire 91b which is connected at 103a with the ungrounded side of the motor armature winding 80a, and to the contact 84b of the field reversing relay 77a and the contact 84a of the companion relay 78a. The armatures 87a and 87b of these relays are connected as before to opposite ends of the motor field coil 79a. The contacts 85a and 85b are grounded and the ungrounded sides of the magnet coils are connected by the wire 91a with the wire 121.

The magnetic switches 116, 117 and 118 each comprise an armature 122 normally disengaged from a contact 123 by a spring 124. The switch 118 has its contact 123 connected with one end of the wire 121. The contacts 123 of the switches 117 and 116 are connected by branches with the wire 121 in which the toggle switches 112 and 111, respectively, are connected to enable cutting the magnets 116 and 117 out of action when desired. In the case of each switch, the armature 122 is connected to the right hand side of that push button manual control switch to which it is related and to one end of the winding of the magnet. The left hand sides of the control switches are connected together and to ground at 72b by the wire 71b and also to the wire 105a which is typically connected to the outer arm 72a of the return switch 54a, the wire 105b being connected between the remaining outer arm 73a and the remaining end of the winding of the corresponding switch 118.

Operation

The semaphore signal is connected to the car battery so that the signal will operate only when the ignition switch is on. Supposing the ignition switch to be on, current flows from the battery 75a through wire 76b to manually controlled switch 66a, and to the branch wire running through the switch 66a to light bulbs 27a and to ground 27b.

To operate semaphore to signal a right turn, button 68a is pressed. This closes a circuit to arm 73a of contact switch 57a. Since arms 73a and 74a are closed this allows the current to flow through wire 91b and through branch wire 103a to armature 80a to ground on opposite sides of armature at 104a. Then through wire 91b to contact points 84a of relay 78a which armature 81a is normally closed with spring 88a, allowing current to flow through field 79a to armature 87b to contact 85b to ground 86b of relay 77a, this relay being normally closed by spring 88b, thereby completing the motor circuit. The operation of the motor turns the shaft 51a whose wormwheel is in mesh with gear 50b which is fastened to shaft 46b, having a cam 53a engageable with spring arm 74a of switch 57a and so as to break the contact of arm 73a and close contact arm 72a leading to left hand element of switch 68a which is grounded at 72b. This grounding deenergizes the motor causing it to stop instantly at the right turn signal position.

The mechanical movement of the semaphore arm when button 68a is pressed is: the motor turns shaft 51a which turns gear 50b which turns shaft 46b on which there is a crank arm attached at upper end 107 where there is a shaft 47a extending upwardly through the slot 45a in the slide 25a which moves slide 35a to which the cable is fastened at 36a. The cable 20a is fastened to bell crank 21 where bell crank 22 is anchored, at 19, at which there is a pin at 15 where plate 13 extends to semaphore arm 14 where the described parts are set in motion by the motor raising the semaphore arm 8 upwardly until the motor causes cam 53a to contact spring arm 74a of switch 57a which closes contact 72a with 74a where 72a is grounded at switch 68a, that deenergizes the motor causing it to stop instantly on that contact.

To make a left turn the driver pushes in left turn button 69a of the manually controlled switch on the dashboard. This starts a current flow to magnetic switch 116 and to arm 122 of that switch. A wire leads from the other side of switch 116 to arm 73a of switch 56a, arm 73a being in contact with arm 74a, the same switch, thus allowing current to flow through wire 91b and through branch wire 103a to motor 80a, the other side of which is grounded at 104a. At the same time, current flows through wire 91b to contact point 84a of relay switch 78a. Armature arm 87a is in contact with point 84a thus allowing current to flow to the field coil 79a, the other side of which goes to armature 87b to contact 85b which is grounded at 86b of relay switch 77a which is normally closed by spring 88b. As the current flows to the field circuit and the motor, the motor is set in motion, raising the signal arm and turning a cam 53a, which raises arm 74a of switch 56a thus breaking the circuit to the motor, and bringing arm 74a into contact with arm 72a which is grounded through one side of push button 69a, said grounding deenergizes motor causing it to stop instantly.

The mechanical movement of the semaphore signal when button 69a is depressed is: motor 42a is set in motion, which will give left turn signal. The motor turns shaft 51a which turns gear 50b which turns shaft 46b at which there is a crank arm attached at upper end 107, where there is a shaft extending upwardly at 47a which the slide 35a fits over shaft 47a in slot 45a which moves slide 35a where there is a cable fastened at 36a. Cable 20a fastens at bell crank 21 where bell crank 22 is anchored, at 19, at which there is a pin at 15 where plate 13 extends to semaphore arm 14 where the described parts are set in motion by the motor raising the semaphore arm 8 upwardly until the motor causes cam 53a to contact spring arm 74a of switch 56a which closes contact 72a where 72a is grounded at switch 69a, that deenergizes motor causing it to stop instantly on that contact.

To make a stop signal the driver pushes button 70a of the manually controlled switch on the dashboard. This starts a current flow to magnetic switch 117 and to arm 122 of that switch. A wire leads from the other side of switch 117 and to arm 73a of switch 55a, arm 73a being in contact with arm 74a of the same switch, thus allowing current to flow through wire 91b and through branch wire 103a to motor 80a, the other side of which is grounded at 104a. At the same time, current flows through wire 91b to contact point 84a of relay switch 78a. Armature arm 87a is in contact with point 84a thus allowing current to flow to the field coil 79a the other side of which goes to armature 87b to contact 85b which is grounded at 86b of relay switch 77a which is normally closed by spring 88b. As the currents flows to the field circuit and the motor, the motor is set in motion raising the signal arm and turning a cam 53a, which raises arm 74a of switch 55a thus breaking the circuit to the motor, and bringing arm 74a into contact with arm 72a which is grounded through one side of push button 70a, said grounding deenergizes motor causing it to stop instantly.

The mechanical movement of the semaphore signal when button 70a is depressed is: Motor 42a is set in motion by pushing button 70a which will give stop signal. The motor turns shaft 51a which turns gear 50b which turns shaft 46b at which there is a crank arm attached at upper end 107 where there is a shaft extending upwardly at 47a which the slide 35a fits over shaft 47a in slot 45a which moves slide 35a where there is a cable fastened at 36a. Cable 20a fastens at bell crank 21 where bell crank 22 is anchored, at 19, at which there is a pin at 15 where plate 13 extends to semaphore arm 14 where the described parts are set in motion by the motor raising the semaphore arm 8 upwardly until the motor causes cam 53a to contact spring arm 74a of switch 55a which closes contact 72a with 74a where 72a is grounded at switch 70a, that deenergizes motor causing it to stop instantly on that contact.

To return signal arm to its off position the button 71a is pushed in, allowing current to flow through field coil 118, the other side of which leads to arm 73a of switch 54a. Since arm 73a is closed with arm 74a this allows a current flow through wire 91b and branch wire 103a, to motor 80a which has the other side grounded at 104a. Also, as current flows through field coil 118 a magnetic field is set up which draws arm 122 into contact with point 123. A wire 121, carries current from this point through branch wire 91a to field coils 89a and 89b of relay switches 77a and 78a. A magnetic field is thus set up in both with the following effect: In 78a, arm 87a is drawn into contact with point 85a which is grounded at 86a. This grounds this side of field circuit 79a motor. At the same time in 77a arm 87b is drawn into contact with point 84b which is connected to hot wire 91b. Thus, you will see here that the field circuit is reverse to that of signals and thus the motor is now running reverse to that of signals. This circuit is used in lowering semaphore arm whereas the first described circuit is used in raising arm. The motor thus runs until cam 53a raises arm 74a, thus breaking circuit to the motor and to the relay switches through 118, also grounding through arm 72a to one side of button 71a, thus deenergizing motor and causing it to stop instantly at off position.

Also incorporated or used in this second embodiment are two toggle switches, 111 and 112, whose use is to permit the changing from one signal position to another without having to return to the off position. As the signal arm passes the stop signal position, toggle switch 112 is closed and as it passes the left turn signal position toggle switch 111 is closed. As these switches are closed they are automatically connected with the off position. Thus, these buttons are now a return button as long as the toggle switches are closed and if one of these is now pushed in, the semaphore electrical circuit will operate exactly as in the case of the off position button except that it will return only the signal arm to the signal position corresponding with the manual control switch button pushed in.

The mechanical movement of the semaphore signal when button 71a is depressed is: Motor 42a is set in motion by pushing button 71a which will return semaphore to normal position. The motor turns shaft 51a which turns gear 50b which turns shaft 46b at which there is a crank arm attached at upper end 107 where there is a shaft extending upwardly at 47a which the slide 35a fits over shaft 47a in slot 45a which moves slide 35a where there is a cable fastened at 36a. Cable 20a fastens at bell crank 21 where bell crank 22 is anchored, at 19, at which there is a pin at 15 where plate 13 extends to semaphore arm 14 where the described parts are set in motion by the motor lowering the semaphore arm 8, downwardly until the motor causes cam 53a to contact spring arm 74a of switch 54a which closes contact 72a with 74a where 72a is grounded at switch 71a, that deenergizes motor causing it to stop instantly on that contact. The semaphore arm is held in any of its operated positions chiefly by the frictional resistance and inertia of the operating parts and of the electric motor to operation by the relatively small weight of the semaphore arm while the electric motor is deenergized.

Having described the invention, what is claimed as new is:

1. In operating means for an automobile signal of the semaphore type, an electric motor operatively connected to the semaphore, said motor having a rotary eccentric element operatively connected to said semaphore, electro-mechanical means effectively connected between a source of electrical energy and said motor for controllably energizing the motor, said electro-mechanical means including manual control switch means, said manual control switch means being operative to condition said electro-mechanical means to predetermine an operated position of said semaphore arm, said electro-mechanical means comprising a pair of reversing relays connected to the field of said motor for reversing the direction of current therethrough, left turn, right turn, stop and return switches arranged for operation in rotation by, said rotary eccentric element of said motor and connected between said reversing relays, said manual control switch means and said source, and operative to deenergize the motor and stop the semaphore arm in the signalling position selected by manual operation of said manual control switch means.

2. A semaphore signal according to claim 1 wherein other electro-magnetic switch means are connected between said pair of reversing relays and said manual control switch means for deenergizing said motor as the semaphore arm reaches the predetermined signaling position to permit said semaphore arm to return to a selected position below the predetermined signaling position.

3. A semaphore signal according to claim 1 wherein other electro-magnetic switch means are connected between said pair of reversing relays and said manual control switch means for deenergizing said motor as the semaphore arm reaches the predetermined signaling position to permit said semaphore arm to return to a selected position below the predetermined signaling position, and additional motor operated switches connected between said manual control switch means and said pair of reversing relays for deenergizing said other electro-magnetic switch means to permit the semaphore arm to swing upwardly without interruption through several signaling positions toward a predetermined upper signaling position before being returned to initial position.

4. A semaphore signal according to claim 1 wherein mechanical means connects said rotary eccentric element to the semaphore arm, said mechanical means comprising a cable connected to the semaphore arm, a slideway, a slide confined in said slideway and connected to said cable, said slide being operatively engaged by said rotary eccentric element whereby the slide is reciprocated as said eccentric element is rotated, said eccentric element being operated by said motor.

RUFUS A. MANN.
W. H. MILLS.